Nov. 10, 1964     R. C. FISCHER     3,156,083
MOWER WITH COUNTER-RECIPROCATING ELEMENTS
Filed Sept. 16, 1960                        3 Sheets-Sheet 1
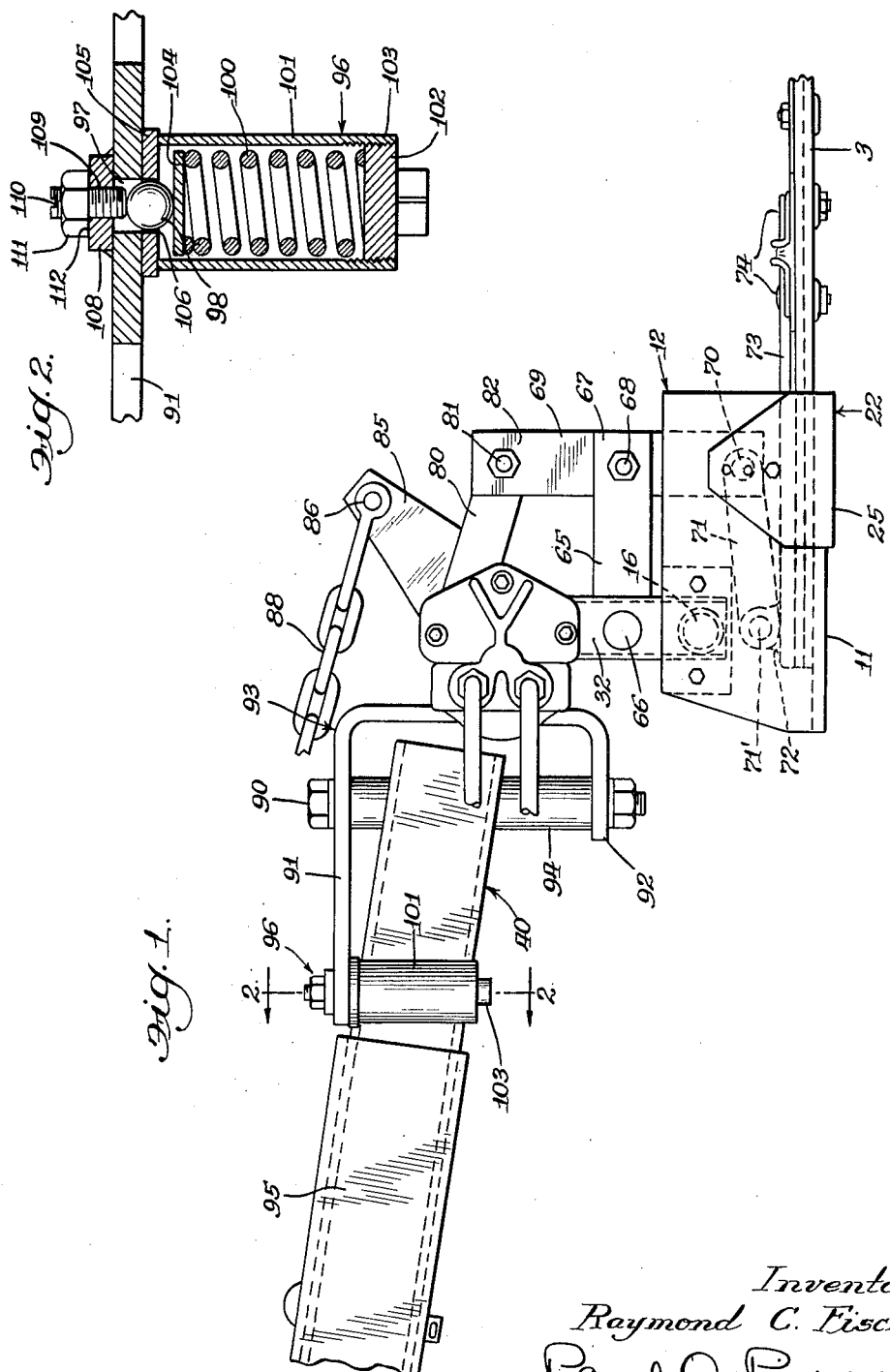
Inventor:
Raymond C. Fischer
Paul O. Pippel
Atty.

Nov. 10, 1964  R. C. FISCHER  3,156,083
MOWER WITH COUNTER-RECIPROCATING ELEMENTS
Filed Sept. 16, 1960  3 Sheets-Sheet 2
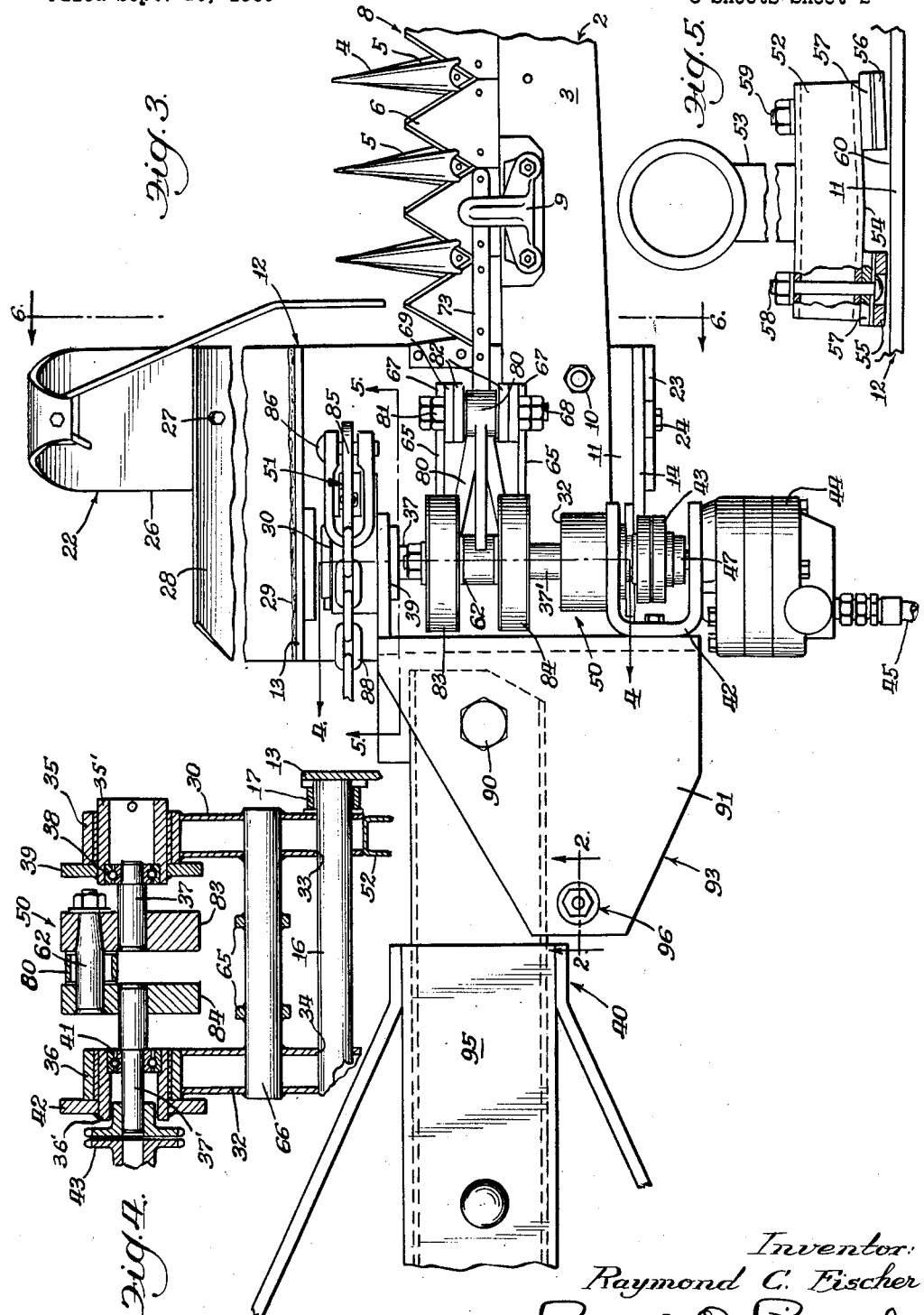
Inventor:
Raymond C. Fischer
Paul O. Pippel
Atty.

Nov. 10, 1964 R. C. FISCHER 3,156,083
MOWER WITH COUNTER-RECIPROCATING ELEMENTS
Filed Sept. 16, 1960 3 Sheets-Sheet 3

Fig. 6.

INVENTOR.
Raymond C. Fischer
BY
Paul O. Pippel
Atty.

United States Patent Office 3,156,083
Patented Nov. 10, 1964

3,156,083
MOWER WITH COUNTER-RECIPROCATING
ELEMENTS
Raymond C. Fischer, Hinsdale, Ill., assignor to International Harvester Company, Chicago, Ill., a corporation of New Jersey
Filed Sept. 16, 1960, Ser. No. 56,406
10 Claims. (Cl. 56—296)

This invention relates to mowers of the reciprocating type and more specifically to a novel arrangement wherein the cooperating cutting elements are counter-reciprocably operated.

Various devices have been proposed and provided for counterbalancing the reciprocating knife blade in a conventional mower for the purpose of minimizing the vibration or to improve the drive so as to permit operation of the mower at various angles of inclination to the horizontal. In general, these innovations have either materially changed the drive or so changed the components so that it required a new inventory of stock parts.

A general object of the invention is to provide a novel, simple and effective mower mechanism wherein the mower bar and the sickle are counter-reciprocated in order to obtain a substantially counterbalanced action.

A more specific object of the invention is to provide a novel driving mechanism for such a mower wherein the mower bar is utilized as the reaction element for the drive linkage which reciprocates the sickle whereby proportional movements are obtained in counter-directions so as to substantially counterbalance the forces involved.

A still further object of the invention is to provide a novel drive means for the sickle wherein the sickle is reciprocated by a pendulating member which is reactively connected to the mower bar, the mower bar being suspended for limited free-swinging reciprocal movement.

The invention comprehends a novel automatically compensating counterbalance between the sickle and the mower bar inasmuch as the action of one is reflected in a directly proportional reaction of the other element of the cutting mechanism. Thus the masses or the acceleration of the sickle and the mower bar are relatively immaterial since a proportional decrease in one factor developing the force of each component is proportionally increased or decreased by the other factor.

A further object is to reciprocate the mower bar and thus the guards to aid in cutting in trashy conditions.

These and other objects and advantages inherent in and encompassed in the invention will become more readily apparent from the specification and the drawings wherein:

FIG. 1 is a fragmentary rear elevational view of a novel mower and driving mounting therefor;

FIG. 2 is an enlarged fragmentary sectional view of a portion of the release mechanism taken substantially on line 2—2 of FIG. 3;

FIG. 3 is an enlarged plan view of the structure shown in FIG. 1;

FIG. 4 is a vertical sectional view taken substantially on the line 4—4 of FIG. 3;

FIG. 5 is a sectional view taken substantially on the line 5—5 of FIG. 3; and

FIG. 6 is a sectional view taken substantially on the line 6—6 of FIG. 3.

Describing the invention in detail and having particular reference to the drawings, there is shown a conventional reciprocating mower generally designated 2 which includes a mower bar 3 with forwardly projecting guard fingers 4 which mount ledger plates 5 which cooperate with sickle sections 6, the sections 6 being connected to a backing bar 7 and reciprocting longitudinally of the mower bar 3 over the respective ledger plates 5 for cutting action therebetween as is well known to those skilled in the art. The sickle generally designated 8 is conventionally retained against the mower bar by means of clips 9.

The mower bar 3 is secured as by bolts 10 to the lower plate 11 of an inner shoe housing generally designated 12. The inner shoe housing in addition to the lower plate 11 comprises a pair of upstanding front and rear walls 13 and 14 which provide a pivotal mounting on a fore and aft extending generally horizontal shaft 16 for the mower bar 3. The shaft 16 extends fore and aft substantially normal to the cutter mechanism 2 and is mounted at opposite ends in bearings 17 and 18 respectively connected to the front and rear walls 13 and 14 by means of bolt and nut assemblies 20 and 21. It will be seen that the housing structure 12 is saddled within a shoe 22 which comprises a back upstanding wall 23 which is laid against the back side of the wall 14 and secured thereto as by bolts 24, the lower edge of the wall 23 merging with a bottom wear or sole plate 25 which projects forwardly and merges into an upturned toe portion 26, the toe portion being connected as by a bolt 27 to a securing plate 28 which is welded as at 29 to the lower edge of the front wall 13 and projects forwardly therefrom.

The shaft 16 affords a generally horizontal pivot for the mower assembly 2 from the lower ends of the substantially vertical front and rear combination lever and hanger members or link means 30 and 32 which are connected as by welding at 33 and 34 at their lower ends to the shaft 16, the upper ends 35 and 36 being pivotally journalled by means of bushings to sleeves 35', 36' which journal the power input shaft or crankshaft sections 37, 37' which extends generally horizontally substantially parallel to the shaft 16, the forward end of the shaft 37 extending through the bearing structure 38 which is carried in sleeve 35' mounted on an upwardly projecting stationary ear or lug 39 on yoke 93 of the support frame generally designated 40 and the rear end of the shaft section 37' being journalled in a bearing structure 41 which is carried in sleeve 36' on an outstanding bracket structure 42 mounted on the support frame 40, the shaft section 37' at its rear end being connected through a flexible or misalignment adjusting coupling 43 to the hydraulic motor 44 which is provided with the hydraulic lines 45 and 46 which suitably port the fluid through the motor for operating the same and rotating the output shaft 47 thereof which connects through the coupling 43 with the input shaft 37' of the mower drive generally designated 50.

Thus it will be seen that the cutter mechanism 2 is pendulously suspended from the support on a substantially horizontal fore and aft extending axis as provided by the shaft 37, 37' and that pendulating movement of the mower bar is limited by means of the foot structure 51 which depends from the lower end of the hanger member 30 and is provided with an elongated abutment structure 52 (FIG. 5) which is connected intermediate its ends from the dependent extension 53 of the element 30, the lower edge or side 54 of the abutment structure 52 being curved about a generally horizontal fore and aft extending axis and being provided with pads 55 and 56 which are adjustably secured by shims 57 and bolt and nut assemblies 58 and 59 to opposite ends of the foot or abutment member 52. Thus it will be realized that since the cutter bar 3 swings about the bearings 17 and 18 its free swinging is limited through abutment of the top side 60 of the bottom wall 11 of the housing 12 with the respective pads 55 and 56 which are preferably of yieldably elastomer material such as fabric impregnated rubber in the nature of tire carcass.

The swinging movement of the mower or cutter bar 3 is induced by the drive mechanism 50 through the medium of the reaction elements or links 65 which are spaced vertically from the mower bar 3 within the lateral confines of the housing structure 12, said members 65 extending lengthwise of the mower and at their inner end being connected to a shaft 66 which extends in a fore and aft direction generally parallel to the shafts 16 and 37 intermediate the same, the shaft 66 being connected at its front and rear ends to the swing links or hangers 30 and 32. The reaction or fulcrum elements 65 are pivotally connected at their outer ends 67 to a pivot member 68 which is disposed substantially horizontally in a fore and aft direction generally parallel to the shaft 66, said pivot member 68 being in the nature of a nut and bolt assembly and affording a pivot for a lever assembly 69 of the first class at a point intermediate the ends thereof, the lever assembly 69 being supported by links 65 and having its lower end pivoted by means of a nut and bolt assembly 70 which extends in a fore and aft direction generally parallel to the pivot 68 to one end of a connecting link 71 which at its other end projects inwardly with respect to the cutter bar and is pivotally connected as at 71' to an upstanding ear structure 72 on a generally horizontal axis substantially parallel to the axis of the pivot 70, the ear 72 being connected to a bar or connecting element 73 which in turn is connected as by rivets 74 to the backing bar 7 of the sickle element 8. It will be appreciated that upon pendulation of the lever 69 about the axis 68 which is substantially normal to the cutter bar 3 that the cutter bar or sickle 8 will be advanced in one direction while simultaneously the reactive forces which are transmitted through the pivot 68, the reaction element 65, the shaft 66 and the hanger elements 30 and 32 will reciprocate the cutter bar 3 in the opposite direction. Since the mass of the cutter bar 3 and the structure attached thereto is of greater weight than the sickle bar, it, of course, will move a lesser distance than the sickle bar as the pendulating lever means or power transmitting element 69 is oscillated by means of the connecting rod 80 which has its distal or outer end pivoted on a substantially horizontal axis by means of the nut and bolt assembly 81 to the upper ends 82 of the elements 69, the axis of the pivot member 81 being substantially parallel to that of the pivot 68. The crank rod or connecting rod 80 is driven from an eccentric or a throw 62 which extends between a pair of counterweighted crank elements or eccentrics 83 and 84 which are connected to the shaft sections 37, 37' respectively. It will be appreciated that rotataion of the shaft sections 37, 37' will rotate the crank 62 driving the rod 80 back and forth pendulating the lever assembly 69 about the fulcrum 65 and also swinging the fulcrum back and forth with the suspension means 30 and 32 thus pendulating or swinging the cutter bar assembly 3 in an opposite direction to the lower end of the assembly 69 driving the connecting linkage 71 through the pivot 71' to the sickle section 8.

The lift for the entire mower assembly is about the axis of the shaft sections 37, 37' and is constituted by an upwardly extending lever arm member 85 which is connected at its lower end to the upper end 35 of the member 30, the upper end of the lever member 85 being connected as at 86 to an operating linkage 88 which is connected in usual manner to a system for raising and lowering the entire mower assembly by pivoting the same about the sections 37, 37' so that the mower assembly may operate at different inclinations with respect to the ground or may be elevated to an upright position for transport.

The entire mower assembly is pivotal about a substantially vertical axis by means of nut and bolt assembly 90 which passes through the upper and lower legs 91 and 92 of the yoke assembly generally designated 93 which forms part of the support structure 40. The bolt 90 passes through a sleeve 94 which is formed integral with the support frame 95 which may be attached in any conventional manner to a motivating vehicle such as a tractor.

The mower is releasably maintained in its extended operating position by means of novel detent mechanism generally indicated 96 which comprises a vertical opening 97 receiving a ball 98 which is spring-urged upwardly into the opening 97 by means of the spring 100 which is carried in tubular casing 101, the casing 101 being secured to the framework 40 in any conventional manner such as by welding and at its lower end being provided with a seat 102 which is in the nature of a cap screw threaded as at 103 into the lower end of the housing 101 for adjusting the compression of the spring urging the same to seat against the plate 104 which bears against the bottom of the ball 98, the ball 98 being centered by means of the closure end member 105 which is secured to the upper edge of the housing 103, the member 105 having a central opening 106 receiving the ball 98 therethrough. The upper leg or plate 91 of the structure 93 is provided with a cover member 108 which is preferably weld-connected to the top side of the plate 91 and threaded as at 109 for receiving the screw 110 which is threaded through a nut 111 which serves as a set screw, nut 111 being threaded on the screw 110 and adapted to be locked by tightening against the top side 112 of the cover 108. It will be appreciated that the adjustment or the projection in length of the screw 110 determines the extent to which the ball 98 enters into the opening 97.

*Operation of the Device*

The mower operates as follows: Drive is initiated from the hydraulic mower 44 into the crankshaft 37 which rotates the throw 62 reciprocating the link or connecting rod 80. The rod 80 pendulates the vertical lever assembly 69 which has a reaction about the fulcrum 68. The lower end of lever assembly 69 reciprocates through the bolt 70, the sickle 8 and simultaneously the fulcrum 68 is reactively reciprocated which through link 65 reciprocates the shaft 66 which in turn reciprocates the hangers or swing links 30, 32, the links 30, 32, being connected by the shaft 66 to the mower bar 3, reciprocate the mower bar in opposition to the sickle. Since force is equal to mass times acceleration and the mower bar has a greater mass its reciprocation will be lesser than the reciprocation of the sickle. However, the two forces will counter-balance each other since the initial action obtains a complementary reaction.

I claim:

1. In a reciprocating mower, a support, the combination of a mower bar and a sickle supported thereon, means swingably supporting the mower bar from said support on an axis generally parallel to the cutting plane of the mower, and means for reciprocating the sickle operatively connected thereto and reactivity connected to the mower bar through said means swingably supporting the mower bar for simultaneously counter-reciprocating the same.

2. The invention according to claim 1, said means for reciprocating the sickle having a drive axis and the swinging axis and drive axis being coincident.

3. In a reciprocating mower, the combination of a cutter bar and a sickle supported thereby, a support at an end of the mower, a drive mechanism comprising a crank having shaft means journaled on the support on a substantially horizontal axis above the cutter bar, link means pendulously mounted from the shaft means pivotally suspending said bar, a lever assembly having an upper end connected to the crank in driven relation thereby, fulcrum means pivotally connected to said lever assembly and reactively connected to said link means, and an operative connection between the lever assembly and the sickle.

4. The invention according to claim 3 and said operative connection being disposed at the lower end of the lever assembly and said fulcrum means connected to the lever assembly intermediate its ends.

5. The invention according to claim 3 and abutment means on the link means and support engageable to limit relative swinging movement therebetween.

6. In a mower of the type having a cutter bar and a sickle, a drive mechanism therefor comprising a support mounted adjacent an end of the cutter bar, a crank journaled in the support for rotation about a fixed axis extending substantially horizontally and generally parallel to the cutter bar, a pair of links swingable about said axis and pivotally suspending said cutter bar from an adjacent end on an axis substantially parallel to the first-mentioned axis, and a driving connection between the crank and the sickle reactively coupled through said links with said cutter bar for reciprocating the same reversely to said knife.

7. In a mower, a cutter bar and a sickle thereon, a support, pendulous means swingably supporting the cutter bar from one end on a substantially horizontal axis extending perpendicular to the longitudinal axis of the cutter bar, and drive means supported from said pendulous means and having a first connection to said sickle and a reaction connection to said cutter bar through said pendulous means driving the latter in opposition to the sickle.

8. In a mower having a cutter bar and a sickle, means swingably supporting said cutter bar at one end for swinging movement about a generally horizontal axis extending substantially perpendicular to the cutter bar, a driving lever assembly having a lower end connected to the sickle and having a connection intermediate its ends to said means, said connections being on axes generally parallel to said first-mentioned axis.

9. The invention according to claim 8 and said means having abutments engageable with the cutter bar limiting free swinging movement between said bar and said means.

10. In a drive for a mower having a cutter bar member and a sickle member, means pivotally suspending the cutter bar member for limited lengthwise free swinging movement, means for counter-reciprocating said members including means drivingly connected to said one of said members and reactively connected to the other member through said means pivotally suspending the cutter bar member.

References Cited in the file of this patent
UNITED STATES PATENTS

| | | |
|---|---|---|
| 2,651,906 | Bonner et al. | Sept. 15, 1953 |
| 2,736,156 | Hardman | Feb. 28, 1956 |
| 2,757,504 | Elfes et al. | Aug. 7, 1956 |
| 2,796,720 | Carlson | June 25, 1957 |
| 2,867,070 | McCall et al. | Jan. 6, 1959 |
| 3,017,736 | Hill | Jan. 23, 1962 |